Patented May 14, 1946

2,400,123

UNITED STATES PATENT OFFICE 2,400,123

PROCESS FOR CANNING SOYBEANS AND PRODUCT

Arthur A. Levinson and Bernard T. Malter, Chicago, and Percy L. Julian, Maywood, Ill., assignors to The Glidden Company, Cleveland, Ohio, a corporation of Ohio No Drawing. Application August 13, 1941, Serial No. 406,648

4 Claims. (Cl. 99—186)

The present invention relates to the canning of soybeans.

Soybeans constitute a source of concentrated protein food, the protein content thereof being considerably greater than in ordinary beans, such as navy beans. They have, therefore, been used as food in a dry or roasted form. Attempts to can them in the usual manner, however, have heretofore proven unsuccessful. When the soybeans are soaked and cooked in water in the ordinary way and then sealed in cans they immediately begin to develop bad odors, taste and discoloration and even within 24 hours after canning are unappetizing and unappealing to the taste. The deterioration rapidly continues until within a few days the beans are spoiled.

According to the present invention there is provided a process for canning soybeans whereby the beans will remain in an edible, palatable condition for long periods of time. In the accomplishment of this purpose it has been found desirable to properly adjust the pH of the soybean material being canned. It has been found that the pH value of the material should not be above a value of 6 during the canning operation.

Since the pH of a bean-water mixture is above this value and remains above it during the canning operation, the desired pH condition for the canning operation may be attained by the addition of acidic material in proper amounts to develop the desired pH value during the cooking or canning operation. Thus where water soluble mineral acids are used the initial pH value of the mixture will be considerably below that which is developed during cooking. It will, of course, be appreciated that seasoning material, as well as salts and other substances present in the soybeans, act as neutralizing and buffering agents to change the pH from that produced when the acid is first added. Also since the protein in the beans is amphoteric it affects the pH value developed. The actual amount of acidic material added, therefore, will depend upon its nature, and the amount and nature of buffering bodies in the particular mixture being canned. Thus other food products which are acid in nature may be employed to wholly or partially produce the desired pH value, and to provide a wide variety of canned soybean products.

Example I

Debittered soybean meats as well as whole beans were employed. The mixtures indicated in Table I were employed and were cooked for 2½ hours at 15 lbs. pressure and the corresponding temperature of 250° F. The mixtures were canned in No. 2, 1 lb. cans. The pH values were observed immediately upon the addition of the electrolyte. Several cans of each formula were made and the pH values and the taste, odor and appearance of the canned materials were observed 24 hours, 11 days, and 30 days after canning.

Table I

| Test | Formula | pH values | | | |
|---|---|---|---|---|---|
| | | Initial | 24 hours | 11 days | 30 days |
| 12 | 500 parts soybean meats<br>1800 parts water | 6.95 | 6.20 | 5.20 | |
| 13 | 500 parts soybean meats<br>1800 parts water<br>6 parts—43% H$_3$PO$_4$ | 2.30 | 5.65 | 5.70 | 5.70 |
| 14 | 500 parts soybean meats<br>1800 parts water<br>2 parts—43% H$_3$PO$_4$ | 3.7 | 6.05 | 6.05 | 5.65 |
| 15 | 500 parts soybean meats<br>1800 parts water<br>1.2 parts—43% H$_3$PO$_4$ | 4.55 | 6.05 | 4.70 | 6.15 |
| 16 | 500 parts soybean meats<br>1800 parts water<br>4 parts 3.5% NaOH | 9.30 | 6.20 | 5.95 | (¹) |
| 17 | 500 parts whole soybeans<br>1800 parts water | 6.90 | 6.05 | 5.95 | 5.32 |

¹ Putrified.

After 24 hours No. 13 was the only one to show a fresh color and to be free from bad odor. All of the rest were of a dingy color and had a sulfide odor.

After 10 days all cans except No. 13 were of a dingy slightly greenish color and showed slight putrefaction. No. 13 was fresh appearing and had a good odor.

After 30 days No. 13 was still as fresh as when first canned. No. 14 had set to a stiff gel, had a bad odor but not as bad as No. 15. It had a dingy color. No. 15 had a sulfur odor, a dingy color and was slightly gelatinous. All the No. 16 cans had putrefied and were "blowers." No. 17 had a sulfur odor and a dingy color.

Example II

In this example mixtures of 500 parts ground beef, 500 parts ground pork, 500 parts soybeans, and 500 parts tomato juice, together with suitable seasoning were canned employing the same canning conditions as in Example I. The acidity of the tomato juice together with the acidity of the meat was sufficient to develop or produce the desired pH value. Three sets of tests were made. In No. 9 the beans were first soaked over-night in a 0.6% salt solution at a 1:15 ratio. In No. 10 the beans were soaked 2½ hours in water. In No. 11 the beans were not soaked. Examinations were made at various times after canning.

Four days after canning all were palatable. Nos. 9 and 11 had a pH of 5.85 and were better appearing than 10 as there was free juice appearing. After 6 days Nos. 9 and 10 were wetter than 11, and slightly more palatable. The pH of No. 9 was 5.83, that of No. 10 was 5.90 and the pH of No. 11 was 5.95. Thirty-eight days after canning a No. 9 can was examined. The mixture was still palatable and had a pH of 5.84. Cans Nos. 10 and 11 were opened 174 days after canning. In each the mass was jelled, but upon slight mashing this disappeared and the mass was nice appearing. Both had an excellent taste although No. 11 was not as good as No. 10 due to the hardness of the beans. The last of the No. 11 cans were opened 193 days after canning and there was no noticeable change from the previous examination.

It is thus seen that when the pH value of the mass produced or developed during the cooking is less than 6, the putrefaction of the beans is prevented and the beans will keep for long periods of time without material change. It is also significant to note that in all tests which were satisfactory, the pH value of the canned product remained substantially constant throughout the test period, as contrasted with the varying pH values of those tests which produced unsatisfactory results. It is to be noted also that while in test 13 of Example I the initial pH indicates quite an acidity, after canning the pH has increased considerably, so that there is no pickling of the beans in the generally accepted meaning. Thus the beans do not possess a disagreeably acid taste.

Having described the invention what is claimed is:

1. In the process of canning soybeans in an aqueous medium the improvement which comprises carrying out the cooking operation in the presence of sufficient acidic material to produce a pH value slightly less than but not greater than 6 during the cooking operation, whereby the canned product possesses a pH value slightly less than but not exceeding 6 which is substantially constant over long periods of time.

2. In the process of canning soybeans in an aqueous medium the improvement which comprises carrying out the cooking operation in the presence of sufficient acidic material to produce a pH value from about 5.65 to not more than 6 during the cooking operation, whereby the canned product possesses a pH value from about 5.65 to not more than 6 which remains substantially constant over long periods of time.

3. An edible food product, stable over long periods of time, comprising canned soybeans in an aqueous medium, said product having a pH value from about 5.65 to not more than 6, said pH value remaining substantially constant over long periods of time.

4. An edible food product, stable over long periods of time, comprising canned soybeans in an aqueous medium, said product having a pH value slightly less than but not greater than 6, said pH value remaining substantially constant over long periods of time.

ARTHUR A. LEVINSON.
BERNARD T. MALTER.
PERCY L. JULIAN.